United States Patent
Chandrasekaran

(10) Patent No.: US 9,240,712 B2
(45) Date of Patent: Jan. 19, 2016

(54) CONTROLLER INCLUDING A COMMON CURRENT-SENSE DEVICE FOR POWER SWITCHES OF A POWER CONVERTER

(71) Applicant: Power Systems Technologies, Ltd., Ebene (MU)

(72) Inventor: Sriram Chandrasekaran, Dallas, TX (US)

(73) Assignee: Power Systems Technologies Ltd., Ebene (MU)

( * ) Notice: Subject to any disclaimer, the term of this patent is extended or adjusted under 35 U.S.C. 154(b) by 139 days.

(21) Appl. No.: 13/714,095

(22) Filed: Dec. 13, 2012

(65) Prior Publication Data

US 2014/0169049 A1 Jun. 19, 2014

(51) Int. Cl.
*G05F 1/59* (2006.01)
*H02M 1/42* (2007.01)
*H02M 3/158* (2006.01)

(52) U.S. Cl.
CPC .......... *H02M 1/4225* (2013.01); *H02M 3/1584* (2013.01); *Y02B 70/126* (2013.01)

(58) Field of Classification Search
CPC ..................................... G05F 1/10; G05F 1/59
USPC .................. 323/207, 222, 268, 272, 283–285
See application file for complete search history.

(56) References Cited

U.S. PATENT DOCUMENTS

| | | | |
|---|---|---|---|
| 1,376,978 A | 5/1921 | Stoekle | |
| 2,387,943 A | 10/1945 | Putman | |
| 2,473,662 A | 6/1949 | Pohm | |
| 3,007,060 A | 10/1961 | Guenther | |
| 3,346,798 A | 10/1967 | Dinger | |
| 3,358,210 A | 12/1967 | Grossoehme | |
| 3,433,998 A | 3/1969 | Woelber | |
| 3,484,562 A | 12/1969 | Kronfeld | |
| 3,553,620 A | 1/1971 | Cielo et al. | |
| 3,602,795 A | 8/1971 | Gunn | |
| 3,622,868 A | 11/1971 | Todt | |
| 3,681,679 A | 8/1972 | Chung | |
| 3,708,742 A | 1/1973 | Gunn | |
| 3,708,744 A | 1/1973 | Stephens et al. | |

(Continued)

FOREIGN PATENT DOCUMENTS

| CN | 101123395 A | 2/2008 |
|---|---|---|
| CN | 101141099 | 3/2008 |

(Continued)

OTHER PUBLICATIONS

Ridley, R., Designing with the TL431, Switching Power Magazine, Designer Series XV, pp. 1-5, 2005.

(Continued)

*Primary Examiner* — Adolf Berhane
*Assistant Examiner* — Yemane Mehari
(74) *Attorney, Agent, or Firm* — Boisbrun Hofman, PLLC

(57) ABSTRACT

A controller for a power converter includes a current-sense device couplable in series with switched terminals of power switches of interleaved switching regulators and configured to produce a current-sense signal. The controller also includes an error amplifier configured to produce an error signal as a function of a characteristic of the power converter. The controller also includes a duty-cycle controller configured to sample the current-sense signal at mid-points of duty cycles of the power switches and regulate the characteristic as a function of the error signal and the current-sense signal.

20 Claims, 5 Drawing Sheets

(56) References Cited

U.S. PATENT DOCUMENTS

| | | |
|---|---|---|
| 4,011,498 A | 3/1977 | Hamsra |
| 4,019,122 A | 4/1977 | Ryan |
| 4,075,547 A | 2/1978 | Wroblewski |
| 4,202,031 A | 5/1980 | Hesler et al. |
| 4,257,087 A | 3/1981 | Cuk |
| 4,274,071 A | 6/1981 | Pfarre |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A | 9/1986 | Roberts |
| 4,636,823 A | 1/1987 | Margalit et al. |
| 4,654,568 A * | 3/1987 | Mansmann .................. 318/293 |
| 4,660,136 A | 4/1987 | Montorefano |
| 4,672,245 A | 6/1987 | Majumdar et al. |
| 4,770,667 A | 9/1988 | Evans et al. |
| 4,770,668 A | 9/1988 | Skoultchi et al. |
| 4,780,653 A | 10/1988 | Bezos et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,866,367 A | 9/1989 | Ridley et al. |
| 4,876,638 A | 10/1989 | Silva et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balakrishnan |
| 5,027,264 A | 6/1991 | DeDoncker et al. |
| 5,055,991 A | 10/1991 | Carroll |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,453,923 A | 9/1995 | Scalais et al. |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A | 7/1996 | Pietkiewicz et al. |
| 5,554,561 A | 9/1996 | Plumton |
| 5,555,494 A | 9/1996 | Morris |
| 5,581,224 A | 12/1996 | Yamaguchi |
| 5,610,085 A | 3/1997 | Yuan et al. |
| 5,624,860 A | 4/1997 | Plumton et al. |
| 5,636,116 A | 6/1997 | Milavec et al. |
| 5,661,642 A | 8/1997 | Shimashita |
| 5,663,876 A | 9/1997 | Newton et al. |
| 5,671,131 A | 9/1997 | Brown |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,386 A | 9/1998 | Gordon |
| 5,864,110 A | 1/1999 | Moriguchi et al. |
| 5,870,296 A | 2/1999 | Schaffer |
| 5,870,299 A | 2/1999 | Rozman |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,907,481 A | 5/1999 | Svardsjo |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A | 7/1999 | Ichikawa et al. |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,982,640 A | 11/1999 | Naveed |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,374 A | 12/2000 | Hayes et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,212,084 B1 | 4/2001 | Turner |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |

(56) References Cited

U.S. PATENT DOCUMENTS

| | | |
|---|---|---|
| 6,320,490 B1 | 11/2001 | Clayton |
| 6,323,090 B1 | 11/2001 | Zommer |
| 6,325,035 B1 | 12/2001 | Codina et al. |
| 6,344,986 B1 | 2/2002 | Jain et al. |
| 6,345,364 B1 | 2/2002 | Lee |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,396,718 B1 | 5/2002 | Ng et al. |
| 6,400,579 B2 | 6/2002 | Cuk |
| 6,414,578 B1 | 7/2002 | Jitaru |
| 6,418,039 B2 | 7/2002 | Lentini et al. |
| 6,438,009 B2 | 8/2002 | Assow |
| 6,445,598 B1 | 9/2002 | Yamada |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,559,689 B1 | 5/2003 | Clark |
| 6,563,725 B2 | 5/2003 | Carsten |
| 6,570,268 B1 | 5/2003 | Perry et al. |
| 6,580,627 B2 | 6/2003 | Toshio |
| 6,597,588 B2 | 7/2003 | Matsumoto |
| 6,608,768 B2 | 8/2003 | Sula |
| 6,611,132 B2 | 8/2003 | Nakagawa et al. |
| 6,614,206 B1 | 9/2003 | Wong et al. |
| 6,636,025 B1 | 10/2003 | Irissou |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,839,247 B1 | 1/2005 | Yang et al. |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,553 B2 | 9/2005 | Zimmermann |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,023,679 B2 | 4/2006 | Tomiyama |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim et al. |
| 7,075,799 B2 | 7/2006 | Qu |
| 7,076,360 B1 | 7/2006 | Ma |
| 7,095,638 B2 | 8/2006 | Uusitalo |
| 7,098,640 B2 | 8/2006 | Brown |
| 7,099,163 B1 | 8/2006 | Ying |
| 7,136,293 B2 | 11/2006 | Petkov et al. |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,375,994 B2 | 5/2008 | Andreycak |
| 7,385,375 B2 | 6/2008 | Rozman |
| 7,386,404 B2 | 6/2008 | Cargonja et al. |
| 7,393,247 B1 | 7/2008 | Yu et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,453,709 B2 | 11/2008 | Park et al. |
| 7,462,891 B2 | 12/2008 | Brar et al. |
| 7,468,649 B2 | 12/2008 | Chandrasekaran |
| 7,471,523 B2 | 12/2008 | Yang |
| 7,471,527 B2 | 12/2008 | Chen |
| 7,489,225 B2 | 2/2009 | Dadafshar |
| 7,499,295 B2 | 3/2009 | Indika de Silva et al. |
| 7,541,640 B2 | 6/2009 | Brar et al. |
| 7,554,430 B2 | 6/2009 | Mehrotra et al. |
| 7,558,037 B1 | 7/2009 | Gong et al. |
| 7,558,082 B2 | 7/2009 | Jitaru |
| 7,567,445 B2 | 7/2009 | Coulson et al. |
| 7,583,555 B2 | 9/2009 | Kang et al. |
| 7,626,370 B1 | 12/2009 | Mei et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |
| 7,778,051 B2 | 8/2010 | Yang |
| 7,787,264 B2 | 8/2010 | Yang et al. |
| 7,791,903 B2 | 9/2010 | Zhang et al. |
| 7,795,849 B2 | 9/2010 | Sohma |
| 7,813,101 B2 | 10/2010 | Morikawa |
| 7,847,535 B2 | 12/2010 | Meynard et al. |
| 7,876,191 B2 | 1/2011 | Chandrasekaran et al. |
| 7,884,588 B2 * | 2/2011 | Adragna et al. ............ 323/272 |
| 7,889,517 B2 | 2/2011 | Artusi et al. |

(56) References Cited

U.S. PATENT DOCUMENTS

| | | |
|---|---|---|
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,125,205 B2 | 2/2012 | Chandrasekaran et al. |
| 8,134,443 B2 | 3/2012 | Chandrasekaran et al. |
| 8,179,699 B2 | 5/2012 | Tumminaro et al. |
| 8,184,456 B1 | 5/2012 | Jain et al. |
| 8,278,889 B2 | 10/2012 | Tateishi |
| 8,467,199 B2 | 6/2013 | Lee et al. |
| 8,488,355 B2 | 7/2013 | Berghegger |
| 8,520,414 B2 | 8/2013 | Garrity et al. |
| 8,520,420 B2 | 8/2013 | Jungreis et al. |
| 8,638,578 B2 | 1/2014 | Zhang |
| 8,643,222 B2 | 2/2014 | Brinlee et al. |
| 8,767,418 B2 | 7/2014 | Jungreis et al. |
| 8,787,043 B2 | 7/2014 | Berghegger |
| 8,792,256 B2 | 7/2014 | Berghegger |
| 8,792,257 B2 | 7/2014 | Berghegger |
| 8,976,549 B2 | 3/2015 | Genannt Berghegger |
| 2001/0020886 A1 | 9/2001 | Matsumoto et al. |
| 2001/0024373 A1 | 9/2001 | Cuk |
| 2001/0055216 A1 | 12/2001 | Shirato |
| 2002/0044463 A1 | 4/2002 | Bontempo et al. |
| 2002/0057080 A1 | 5/2002 | Telefus et al. |
| 2002/0071295 A1 | 6/2002 | Nishikawa |
| 2002/0101741 A1 | 8/2002 | Brkovic |
| 2002/0110005 A1 | 8/2002 | Mao et al. |
| 2002/0114172 A1 | 8/2002 | Webb et al. |
| 2002/0145888 A1 | 10/2002 | Yoshinaga et al. |
| 2002/0167385 A1 | 11/2002 | Ackermann |
| 2002/0176262 A1 | 11/2002 | Tripathi et al. |
| 2003/0026115 A1 | 2/2003 | Miyazaki |
| 2003/0030422 A1 | 2/2003 | Sula |
| 2003/0039129 A1 | 2/2003 | Miyazaki et al. |
| 2003/0063483 A1 | 4/2003 | Carsten |
| 2003/0063484 A1 | 4/2003 | Carsten |
| 2003/0076079 A1 | 4/2003 | Alcantar et al. |
| 2003/0086279 A1 | 5/2003 | Bourdillon |
| 2003/0197585 A1 | 10/2003 | Chandrasekaran et al. |
| 2003/0198067 A1 | 10/2003 | Sun et al. |
| 2004/0032754 A1 | 2/2004 | Yang |
| 2004/0034555 A1 | 2/2004 | Dismukes et al. |
| 2004/0064621 A1 | 4/2004 | Dougherty et al. |
| 2004/0148047 A1 | 7/2004 | Dismukes et al. |
| 2004/0156220 A1 | 8/2004 | Kim et al. |
| 2004/0174147 A1 | 9/2004 | Vinciarelli |
| 2004/0196672 A1 | 10/2004 | Amei |
| 2004/0200631 A1 | 10/2004 | Chen |
| 2004/0217794 A1 | 11/2004 | Strysko |
| 2004/0257095 A1 | 12/2004 | Yang |
| 2005/0024179 A1 | 2/2005 | Chandrasekaran et al. |
| 2005/0046404 A1 | 3/2005 | Uusitalo |
| 2005/0052224 A1 | 3/2005 | Yang et al. |
| 2005/0052886 A1 | 3/2005 | Yang et al. |
| 2005/0207189 A1 | 9/2005 | Chen |
| 2005/0245658 A1 | 11/2005 | Mehrotra et al. |
| 2005/0254266 A1 | 11/2005 | Jitaru |
| 2005/0254268 A1 | 11/2005 | Reinhard et al. |
| 2005/0281058 A1 | 12/2005 | Batarseh et al. |
| 2005/0286270 A1 | 12/2005 | Petkov et al. |
| 2006/0006975 A1 | 1/2006 | Jitaru et al. |
| 2006/0006976 A1 | 1/2006 | Bruno |
| 2006/0007713 A1 | 1/2006 | Brown |
| 2006/0018136 A1 | 1/2006 | Takahashi |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0044845 A1 | 3/2006 | Fahlenkamp |
| 2006/0091430 A1 | 5/2006 | Sriram et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0227576 A1 | 10/2006 | Yasumura |
| 2006/0237968 A1 | 10/2006 | Chandrasekaran |
| 2006/0255360 A1 | 11/2006 | Brar et al. |
| 2006/0271315 A1 | 11/2006 | Cargonja et al. |
| 2006/0286865 A1 | 12/2006 | Chou et al. |
| 2007/0007945 A1 | 1/2007 | King et al. |
| 2007/0010298 A1 | 1/2007 | Chang |
| 2007/0019356 A1 | 1/2007 | Morikawa |
| 2007/0025124 A1 | 2/2007 | Hansson |
| 2007/0030717 A1 | 2/2007 | Luger et al. |
| 2007/0041224 A1 | 2/2007 | Moyse et al. |
| 2007/0045765 A1 | 3/2007 | Brar et al. |
| 2007/0058402 A1 | 3/2007 | Shekhawat et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0139984 A1 | 6/2007 | Lo |
| 2007/0159857 A1 | 7/2007 | Lee |
| 2007/0206523 A1 | 9/2007 | Huynh et al. |
| 2007/0222463 A1 | 9/2007 | Qahouq et al. |
| 2007/0241721 A1 | 10/2007 | Weinstein et al. |
| 2007/0274106 A1 | 11/2007 | Coulson et al. |
| 2007/0274107 A1 | 11/2007 | Garner et al. |
| 2007/0296028 A1 | 12/2007 | Brar et al. |
| 2007/0296383 A1 | 12/2007 | Xu |
| 2007/0298559 A1 | 12/2007 | Brar et al. |
| 2007/0298564 A1 | 12/2007 | Brar et al. |
| 2008/0012423 A1 | 1/2008 | Mimran |
| 2008/0024094 A1 | 1/2008 | Nishihara et al. |
| 2008/0024259 A1 | 1/2008 | Chandrasekaran et al. |
| 2008/0030178 A1 | 2/2008 | Leonard et al. |
| 2008/0031021 A1 | 2/2008 | Ros et al. |
| 2008/0037294 A1 | 2/2008 | Indika de Silva et al. |
| 2008/0043503 A1 | 2/2008 | Yang |
| 2008/0054874 A1 | 3/2008 | Chandrasekaran et al. |
| 2008/0061746 A1 | 3/2008 | Kobayashi et al. |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0175026 A1 | 7/2008 | Yang |
| 2008/0198638 A1 | 8/2008 | Reinberger et al. |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0298106 A1 | 12/2008 | Tataeishi |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0027926 A1 | 1/2009 | Yang et al. |
| 2009/0037768 A1 | 2/2009 | Adamas |
| 2009/0046486 A1 | 2/2009 | Lu et al. |
| 2009/0072626 A1 | 3/2009 | Watanabe et al. |
| 2009/0097290 A1 | 4/2009 | Chandrasekaran |
| 2009/0109711 A1 | 4/2009 | Hsu |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0289557 A1 | 11/2009 | Itoh et al. |
| 2009/0290385 A1 | 11/2009 | Jungreis et al. |
| 2009/0310388 A1 | 12/2009 | Yang |
| 2009/0315530 A1 | 12/2009 | Baranwal |
| 2010/0020578 A1 | 1/2010 | Ryu et al. |
| 2010/0054000 A1 | 3/2010 | Huynh |
| 2010/0066336 A1 | 3/2010 | Araki et al. |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0164400 A1 | 7/2010 | Adragna |
| 2010/0164443 A1 | 7/2010 | Tumminaro et al. |
| 2010/0182806 A1 | 7/2010 | Garrity et al. |
| 2010/0188876 A1 | 7/2010 | Garrity et al. |

(56) References Cited

U.S. PATENT DOCUMENTS

| | | |
|---|---|---|
| 2010/0202165 A1 | 8/2010 | Zheng et al. |
| 2010/0213989 A1 | 8/2010 | Nakatake |
| 2010/0219802 A1 | 9/2010 | Lin et al. |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0025289 A1 | 2/2011 | Wang et al. |
| 2011/0038179 A1 | 2/2011 | Zhang |
| 2011/0062926 A1 | 3/2011 | Qiu et al. |
| 2011/0080102 A1 | 4/2011 | Ge et al. |
| 2011/0089917 A1 | 4/2011 | Chen et al. |
| 2011/0095730 A1 | 4/2011 | Strijker et al. |
| 2011/0134664 A1 | 6/2011 | Berghegger |
| 2011/0149607 A1 | 6/2011 | Jungreis et al. |
| 2011/0157936 A1 | 6/2011 | Huynh |
| 2011/0182089 A1 | 7/2011 | Berghegger |
| 2011/0239008 A1 | 9/2011 | Lam et al. |
| 2011/0241738 A1 | 10/2011 | Tamaoka |
| 2011/0305047 A1 | 12/2011 | Jungreis et al. |
| 2012/0020119 A1 | 1/2012 | Tang et al. |
| 2012/0243271 A1 | 9/2012 | Berghegger |
| 2012/0250378 A1 | 10/2012 | Kok et al. |
| 2012/0294048 A1 | 11/2012 | Brinlee |
| 2013/0003430 A1 | 1/2013 | Reddy |
| 2013/0229829 A1 | 9/2013 | Zhang et al. |
| 2013/0250627 A1 | 9/2013 | Herfurth |
| 2014/0091720 A1 | 4/2014 | Brinlee |
| 2014/0254215 A1 | 9/2014 | Brinlee et al. |
| 2014/0301111 A1 | 10/2014 | Jungreis et al. |
| 2015/0138857 A1 | 5/2015 | Ye et al. |

FOREIGN PATENT DOCUMENTS

| | | |
|---|---|---|
| CN | 101202509 | 6/2008 |
| CN | 201252294 | 6/2009 |
| DE | 10112820 A1 | 10/2002 |
| DE | 10310361 | 9/2004 |
| DE | 10352509 A1 | 6/2005 |
| DE | 102013104899 A1 | 11/2014 |
| EP | 0665634 | 1/1994 |
| JP | 57097361 | 6/1982 |
| JP | 3215911 | 9/1991 |
| JP | 200068132 | 3/2000 |
| JP | 2008283818 A | 11/2008 |
| WO | WO8700991 | 2/1987 |
| WO | 03088463 A1 | 10/2003 |
| WO | WO2010083511 | 7/2010 |
| WO | WO2010083514 | 7/2010 |
| WO | WO2010114914 | 10/2010 |
| WO | WO2011116225 | 9/2011 |

OTHER PUBLICATIONS

Bill Andreycak, Active Clamp and Reset Technique Enhances Forward Converter Performance, Oct. 1994, Texas Instruments, 19 pages.
"AN100: Application Note using Lx100 Family of High Performance N-Ch JFET Transistors," AN100.Rev 1.01, Sep. 2003, 5 pp., Lovoltech, Inc., Santa Clara, CA.
"AN101A: Gate Drive Network for a Power JFET," AN101A.Rev 1.2, Nov. 2003, 2 pp., Lovoltech, Inc., Santa Clara, CA.
"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.
Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.
Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.
Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.
Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.
Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.
Curtis, K., "Advances in Microcontroller Peripherals Facilitate Current-Mode for Digital Power Supplies," Digital Power Forum '06, 4 pp., Sep. 2006, Darnell Group, Richardson, TX.
Eisenbeiser, K., et al., "Manufacturable GaAs VFET for Power Switching Applications," IEEE Electron Device Letters, Apr. 2000, pp. 144-145, vol. 21, No. 4, IEEE.
Freescale Semiconductor, "Implementing a Digital AC/DC Switched-Mode Power Supply using a 56F8300 Digital Signal Controller," Application Note AN3115, Aug. 2005, 24 pp., Chandler, AZ.
Freescale Semiconductor, "56F8323 Evaluation Module User Manual, 56F8300 16-bit Digital Signal Controllers", MC56F8323EVMUM, Rev. 2, Jul. 2005 (72 pages).
Freescale Semiconductor, "56F8323/56F8123 Data Sheet Preliminary Technical Data, 56F8300 16-bit Digital Signal Controllers," MC56F8323 Rev. 17, Apr. 2007 (140 pages).
Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).
Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264 -I-267, vol. 1, IEEE, Geneva, Switzerland.
Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.
Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.
Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.
Kollman, R., et al., "10 MHz PWM Converters with GaAs VFETs," IEEE 11th Annual Applied Power Electronics Conference and Exposition, Mar. 1996, pp. 264-269, vol. 1, IEEE.
Kuwabara, K., et al., "Switched-Capacitor DC—DC Converters," Fujitsu Limited, IEEE, 1988, Kawasaki, Japan, pp. 213-218.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Lenk, R., "Introduction to the Tapped Buck Converter," PCIM 2000, HFPC 2000 Proceedings, Oct. 2000, pp. 155-166.
Liu, W., "Fundamentals of III-V Devices: HBTs, MESFETs, and HFETs/HEMTs," §5-5: Modulation Doping, 1999, pp. 323-330, John Wiley & Sons, New York, NY.
Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.
Maxim, Application Note 725, www.maxim-ic.com/an725, Maxim Integrated Products, Nov. 29, 2001, 8 pages.
Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Miwa, B.A., et al., "High Efficiency Power Factor Correction Using Interleaving Techniques," IEEE Proceedings of APEC, 1992, pp. 557-568, IEEE, Los Alamitos, CA.
National Semiconductor Corporation, "LM2665 Switched Capacitor Voltage Converter," www.national.com, Sep. 2005, 9 pages.

(56) References Cited

OTHER PUBLICATIONS

National Semiconductor Corporation, "LMC7660 Switched Capacitor Voltage Converter," www.national.com, Apr. 1997, 12 pages.
Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.
Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.
O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.
Peng, C., et al., "A New Efficient High Frequency Rectifier Circuit," Proceedings of 1991 High Frequency Power Conversion (HFPC '91) Conference, Jun. 1991, pp. 236-243, Toronto, CA.
Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.
Plumton, D.L., et al., "A Low On-Resistance High-Current GaAs Power VFET," IEEE Electron Device Letters, Apr. 1995, pp. 142-144, vol. 16, No. 4, IEEE.
Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.
Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.
Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Texas Instruments Incorporated, "LT1054, LT1054Y Switched-Capacitor Voltage Converters With Regulators," SLVS033C, Feb. 1990—Revised Jul. 1998, 25 pages.
Thaker, M., et al., "Adaptive/Intelligent Control and Power Management Reduce Power Dissipation and Consumption," Digital Power Forum '06, 11 pages, Sep. 2006, Darnell Group, Richardson, TX.
Vallamkonda, S., "Limitations of Switching Voltage Regulators," A Thesis in Electrical Engineering, Texas Tech University, May 2004, 89 pages.
Wei, J., et al., "Comparison of Three Topology Candidates for 12V VRM," IEEE APEC, 2001, pp. 245-251, IEEE, Los Alamitos, CA.
Weitzel, C.E., "RF Power Devices for Wireless Communications," 2002 IEEE MTT-S CDROM, 2002, pp. 285-288, paper TU4B-1, IEEE, Los Alamitos, CA.
Williams, R., "Modern GaAs Processing Methods," 1990, pp. 66-67, Artech House, Inc., Norwood, MA.
Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.
Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.
Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.
Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.
Xu, P., et al., "A Novel Integrated Current Doubler Rectifier," IEEE 2000 Applied Power Electronics Conference, Mar. 2000, pp. 735-740, IEEE, Los Alamitos, CA.
Xu, P., et al., "Design and Performance Evaluation of Multi-Channel Interleaved Quasi-Square-Wave Buck Voltage Regulator Module," HFPC 2000 Proceedings, Oct. 2000, pp. 82-88.
Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.
Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.
Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.
Zhou, X., et al., "Investigation of Candidate VRM Topologies for Future Microprocessors," IEEE Applied Power Electronics Conference, Mar. 1998, pp. 145-150, IEEE, Los Alamitos, CA.

\* cited by examiner

US 9,240,712 B2
CONTROLLER INCLUDING A COMMON CURRENT-SENSE DEVICE FOR POWER SWITCHES OF A POWER CONVERTER

TECHNICAL FIELD

The present invention is directed, in general, to power electronics and, more specifically, to a controller for a power converter and method of operating the same.

BACKGROUND

A switched-mode power converter (also referred to as a "power converter") is a power supply or power processing circuit that converts an input voltage waveform into a specified output voltage waveform. A power factor correction ("PFC") power converter includes a power train with a PFC stage that is generally followed by a regulation and isolation stage. The power converter is coupled to a source of electrical power (an alternating current ("ac") power source) and provides a direct current ("dc") output voltage. The PFC stage receives a rectified version of the ac input voltage (from the ac power source) and provides a dc bus voltage. The regulation and isolation stage employs the bus voltage to provide the dc output voltage to a load. The power converter including the PFC stage and the regulation and isolation stage can be employed to construct an "ac adapter" to provide the dc output voltage to a notebook computer or the like from the ac power source.

Controllers associated with the power converter manage an operation thereof by controlling conduction periods of power switches employed therein. Generally, the controllers are coupled between an input and an output or coupled to terminals associated with internal characteristics such as an internal bus voltage of the power converter in a feedback loop configuration (also referred to as a "control loop" or "closed control loop").

A PFC power converter is frequently constructed with two interleaved boost switching regulators, which is a circuit configuration that is frequently employed to reduce input and output ripple currents and the size of filters that are needed to meet an electromagnetic interference requirement. Average current-mode control is also frequently employed to regulate a characteristic of the power converter, such as an internal bus voltage or output voltage thereof. Controlling an average value of a current in a boost switching regulator such as an average current in a boost inductor generally produces better harmonic distortion and power factor correction performance than controlling the peak value of a current therein.

However, conventional techniques to control an average value of a current in a PFC power converter formed with two interleaved boost switching regulators generally produces unequal currents in the two interleaved boost switching regulators. Unequal currents generate a higher level of input and output ripple currents, which degrades the electromagnetic interference performance of the PFC power converter.

Accordingly, what is needed in the art is a controller that produces substantially equal currents in a power train formed with two interleaved boost switching regulators to avoid the deficiencies in the prior art.

SUMMARY OF THE INVENTION

Technical advantages are generally achieved, by advantageous embodiments of the present invention, including a controller for a power converter and method of operating the same. In one embodiment, the controller includes a current-sense device couplable in series with switched terminals of power switches of interleaved switching regulators and configured to produce a current-sense signal. The controller also includes an error amplifier configured to produce an error signal as a function of a characteristic of the power converter. The controller also includes a duty-cycle controller configured to sample the current-sense signal at mid-points of duty cycles of the power switches and regulate the characteristic as a function of the error signal and the current-sense signal.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments will be described with respect to a specific context, namely, a controller for a power converter. While embodiments will be described in the environment of a controller for a power factor correction power converter formed with two interleaved boost switching regulators, any application that may benefit from a controller such as a power amplifier or a motor controller is well within the broad scope of the present invention.

Figure 1:
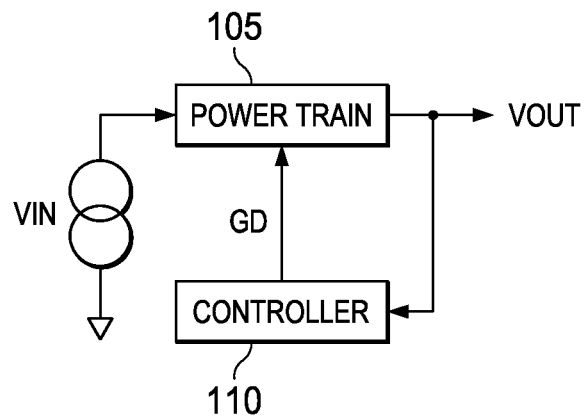
FIG. 1 illustrates a block diagram of an embodiment of a power converter including a controller.

Referring initially to FIG. 1, illustrated is a block diagram of an embodiment of a power converter including a controller 110. The power converter is coupled to ac mains represented by an ac power source providing an input voltage Vin. The power converter includes a power train 105 that is controlled by the controller 110. The controller 110 generally measures an operating characteristic of the power converter such as its output voltage Vout or an internal bus voltage and produces a gate-drive signal GD to control a duty cycle D of a power switch therein in response to the measured operating characteristic to regulate the same. The power train 105 may include multiple power stages to provide a regulated output voltage Vout or other output characteristic to a load. The power train 105 of the power converter generally includes a plurality of power switches coupled to a magnetic device to provide the power conversion function.

Figure 2:
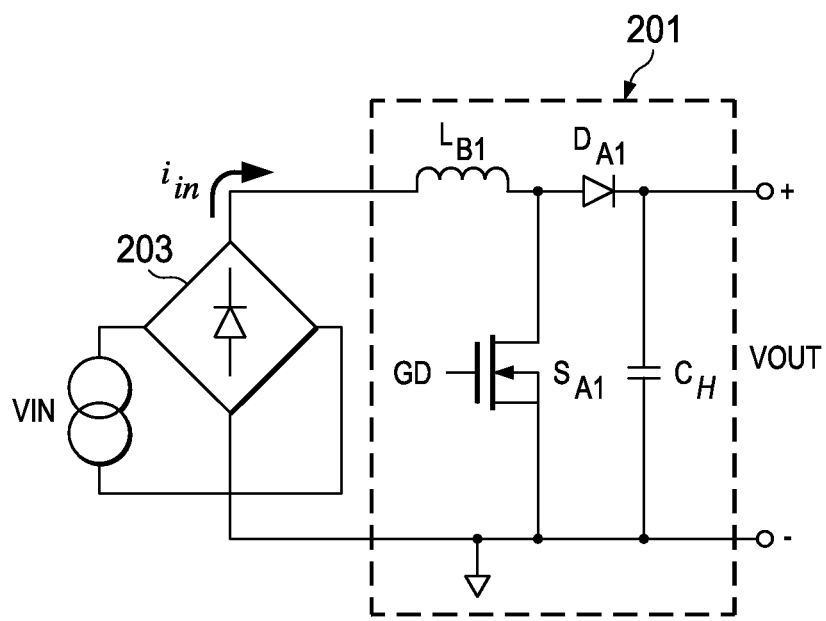
FIG. 2 illustrates a schematic diagram of a portion of power converter including an exemplary power train employing a boost topology.

Turning now to FIG. 2, illustrated is a schematic diagram of a portion of power converter including an exemplary power train (e.g., a power factor correction ("PFC") stage 201) employing a boost switching regulator (e.g., a PFC boost stage). The PFC stage 201 of the power converter receives an input voltage Vin (e.g., an unregulated ac input voltage) from a source of electrical power such as ac mains at an input thereof and provides a regulated dc output voltage Vout (e.g., a bus voltage). In keeping with the principles of a boost topology, the output voltage Vout is generally higher than the input voltage Vin such that a switching operation thereof can regulate the output voltage Vout. A main power switch $S_{A1}$ (e.g., an n-channel metal-oxide semiconductor ("NMOS") "active" switch) is enabled to conduct by a gate-drive signal GD for a primary interval and couples the input voltage Vin through a bridge rectifier 203 to a boost inductor $L_{B1}$. During a primary interval D of a switching cycle, an inductor current $i_{in}$ increases and flows through the boost inductor $L_{B1}$ to local circuit ground. The boost inductor $L_{B1}$ is generally formed with a single-layer winding to reduce the proximity effect to increase the efficiency of the power converter.

The duty cycle for the PFC stage 201 depends in steady state on the ratio of the input voltage and the output voltage, Vin, Vout, respectively, according to the equation:

$$D = 1 - \frac{Vin}{Vout}.$$

During a complementary interval 1-D, the main power switch $S_{A1}$ is transitioned to a non-conducting state and an auxiliary power switch (e.g., the diode $D_{A1}$) conducts. In an alternative circuit arrangement, the auxiliary power switch may include a second active switch that is controlled to conduct by a complementary gate-drive signal. The auxiliary power switch $D_{A1}$ provides a path to maintain a continuity of the inductor current $i_{in}$ flowing through the boost inductor $L_{B1}$. During the complementary interval 1-D, the inductor current $i_{in}$ flowing through the boost inductor $L_{B1}$ decreases, and may become zero and remain zero for a period of time resulting in a "discontinuous conduction mode" of operation.

During the complementary interval 1-D, the inductor current $i_{in}$ flowing through the boost inductor $L_{B1}$ flows through the diode $D_{A1}$ (i.e., the auxiliary power switch) into a filter capacitor $C_H$. In general, the duty cycle of the main power switch $S_{A1}$ (and the complementary duty cycle of the auxiliary power switch $D_{A1}$) may be adjusted to maintain a regulation of the output voltage Vout of the PFC stage 201. Those skilled in the art understand that conduction periods for the main and auxiliary power switches $S_{A1}$, $D_{A1}$ may be separated by a small time interval by the use of "snubber" circuit elements (not shown) or by control circuit timing to avoid cross conduction current therebetween, and beneficially to reduce the switching losses associated with the power converter. Circuit and control techniques to avoid cross-conduction currents between the main and auxiliary power switches $S_{A1}$, $D_{A1}$ are well understood in the art and will not be described further in the interest of brevity. The boost inductor $L_{B1}$ is generally formed with a single-layer winding to reduce power loss associated with the proximity effect.

Figure 3:
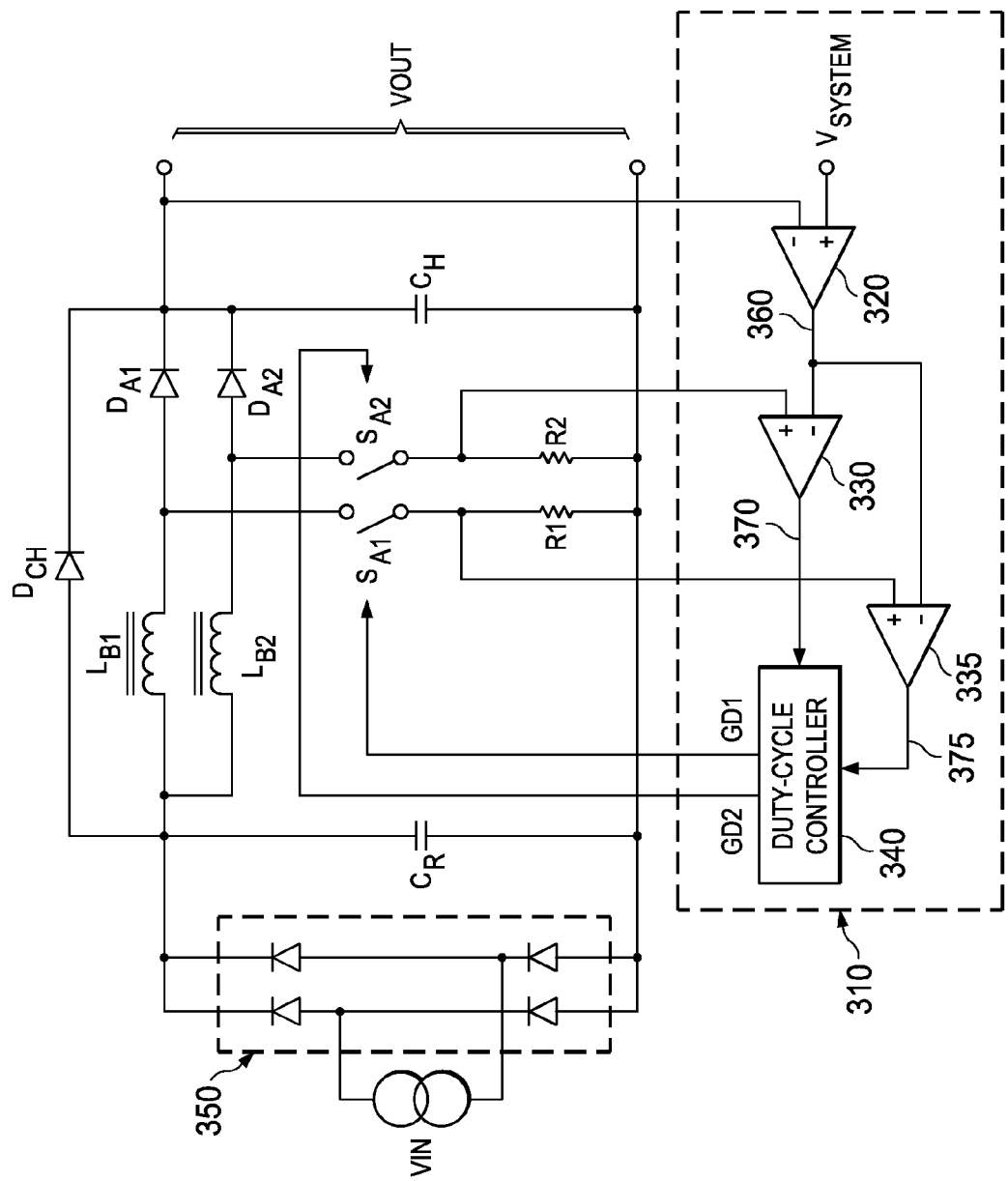
FIG. 3 illustrates a schematic diagram of an embodiment of a power converter formed with two interleaved boost switching regulators.

Turning now to FIG. 3, illustrated is a schematic diagram of an embodiment of a power converter formed with two interleaved boost switching regulators (a first and a second interleaved boost switching regulator, see, e.g., the PFC stage 201 of FIG. 2). The interleaved boost switching regulators and a regulation and isolation stage can be employed to construct an "ac adapter" to provide a dc output voltage Vout (e.g., 19.5 volts) to a notebook computer from an ac mains source (represented by input voltage Vin).

The input voltage Vin is coupled to a four-diode bridge 350 to produce a rectified input voltage. A capacitor $C_R$ is a high-frequency by-pass capacitor and a filter capacitor $C_H$ filters the output voltage Vout. A diode $D_{CH}$ is included to prevent overshoot of the output voltage Vout during start-up of the power converter.

The first interleaved boost switching regulator is formed with a first boost inductor $L_{B1}$, a first main power switch $S_{A1}$ and a first current-sense resistor R1. The second interleaved boost switching regulator is formed with a second boost inductor $L_{B2}$, a second main power switch $S_{A2}$ and a second current-sense resistor R2. An error amplifier 320 senses the output voltage Vout which is compared with a power system reference voltage $V_{system}$ to produce an error signal 360. The error signal 360 is coupled to an inverting input of a comparator 330 that compares the error signal 360 with a current-sense signal produced across the second current-sense resistor R2 to produce an average-current signal 370. The average-current signal 370 is employed by a duty-cycle controller 340 to produce a gate-drive signal GD2 to control the second main power switch $S_{A2}$ of the second interleaved boost switching regulator. Similarly, the error signal 360 is coupled to an inverting input of a comparator 335 that compares the error signal 360 with a current-sense signal produced across the first current-sense resistor R1 to produce an average-current signal 375. The average-current signal 375 is employed by the duty-cycle controller 340 to produce a gate-drive signal GD1 to control the first main power switch $S_{A1}$ of the first interleaved boost switching regulator.

The power converter is formed with a controller 310 to produce duty cycles D1, D2 and, accordingly, gate-drive signals GD1, GD2 for the first and second main power switches $S_{A1}$, $S_{A2}$ of the first and second interleaved boost switching regulators, respectively. The controller 310 includes the error amplifier 320 with a non-inverting input coupled to a reference voltage $V_{system}$, and an inverting input coupled to the output voltage Vout of the power converter. In an embodiment, the inverting input of the error amplifier 320 is coupled to the output voltage Vout through a resistor-divider (not shown) to produce a scaled value of the output voltage Vout.

An output of the error amplifier 320 is coupled to an input of the comparator 330 and an input of the comparator 335, and the another input of the comparator 330 is coupled to the second current-sense resistor R2. Another input of the comparator 335 is coupled to the first current-sense resistor R1.

Average currents in the first and second boost inductors $L_{B1}$, $L_{B2}$ are obtained by sampling currents in the first and second main power switches $S_{A1}$, $S_{A2}$ at their respective mid-points of their ON durations (i.e., during their respective duty cycle D1, D2). The average-current signals 370, 375 from the comparators 330, 335, respectively, are coupled to the duty-cycle controller 340.

The controller 310 uses the duty-cycle controller 340 to produce the duty cycles D1, D2 for the gate drive signals GD1, GD2 and determine the mid-points of the ON durations of the first and second main power switches $S_{A1}$, $S_{A2}$. The controller 310 samples the currents in the first and second main power switches $S_{A1}$, $S_{A2}$ at their respective mid-points of their ON durations. Current balancing is achieved by comparing the current samples from the two interleaved boost switching regulators and adjusting the respective duty cycle for each boost switching regulator. The current balancing between the two interleaved boost switching regulators is imprecisely achieved due to unequal offsets of the comparators 330, 335, unequal first and second current-sense resistors R1, R2, and imprecision in timing for current sensing at the mid-points of the ON durations of the respective first and second main power switches $S_{A1}$, $S_{A2}$ of the first and second interleaved boost switching regulators.

Figure 4:
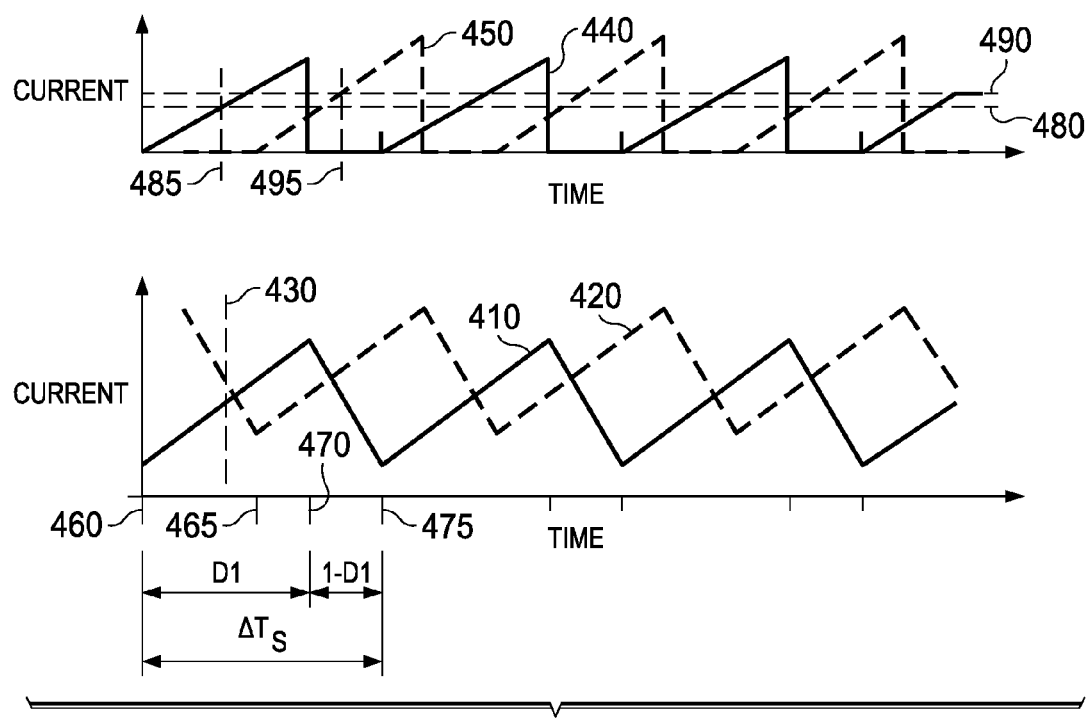
FIG. 4 illustrates graphical representations of exemplary operational parameters of the power converter of FIG. 3.

Turning now to FIG. 4, illustrated are graphical representations of exemplary operational parameters of the power converter of FIG. 3. The current waveform 410 represents current in the first boost inductor LB1 and the current waveform 420 represents current in the second boost inductor LB2. The duty cycle for the first interleaved boost switching regulator is initiated by duty-cycle controller 340 at a beginning time 460 of a switching cycle of duration $\Delta T_s$, and the switching cycle ends at an end time 475. The duty cycle for the second interleaved boost switching regulator is initiated by the duty-cycle controller 340 at a mid-point 465 of the switching cycle. The duty cycle D1 for the first interleaved boost switching regulator is terminated at the point 470. The current in the first main power switch $S_{A1}$ is sampled at the mid-point 430 of its duty cycle.

In an upper portion of FIG. 4, a current waveform 440 of current in the first main power switch $S_{A1}$ and a current waveform 450 of current in the second main power switch $S_{A2}$ are illustrated. An effective threshold level 480 for the comparator 330 produced by the error amplifier 320 (crossing current waveform 440 at a time 485) and a corresponding effective threshold level 490 for the comparator 335 (crossing current waveform 450 at a time 495) are illustrated in the upper portion of FIG. 4. These effective threshold levels 480, 490 are not equal due to the unequal offsets of the comparators 330, 335, the unequal resistances of the first and second current-sense resistors R1, R2, and the imprecision in timing for current sensing at the mid-points 430, 465 of the ON durations of the respective first and second main power switches $S_{A1}$, $S_{A2}$ of the first and second interleaved boost switching regulators. As a result, the main power switch current waveforms 440, 450 are not of equal amplitude, as well as the current waveforms 410, 420 of currents in the first and second boost inductors $L_{B1}$, $L_{B2}$, respectively, resulting in a higher level of electromagnetic interference and unequal heating of components in the two interleaved boost switching regulators.

Figure 5:
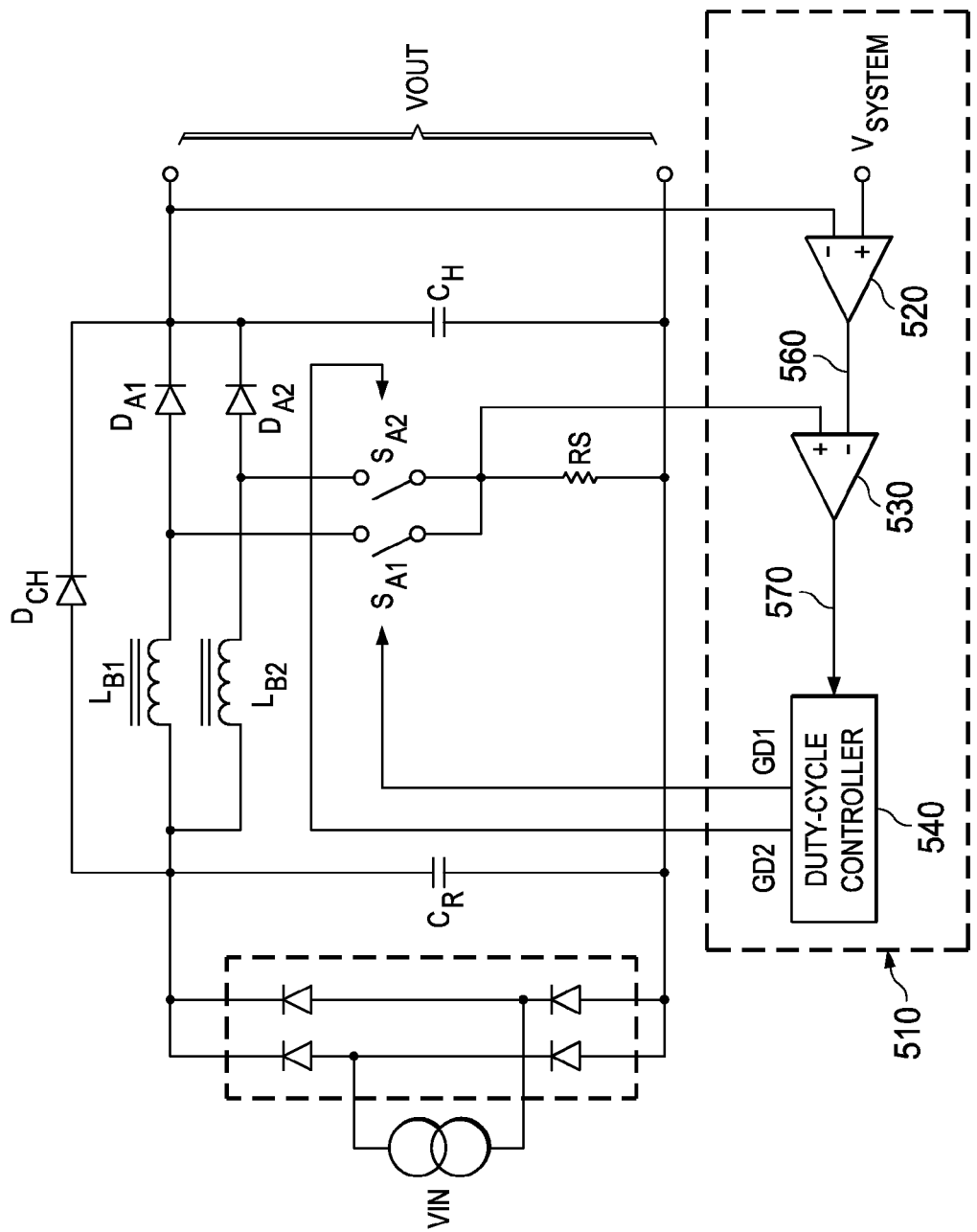
FIG. 5 illustrates a schematic diagram of another embodiment of a power converter formed with two interleaved boost switching regulators.

Turning now to FIG. 5, illustrated is a schematic diagram of another embodiment of a power converter formed with two interleaved boost switching regulators (a first and a second interleaved boost switching regulator, see, e.g., the PFC stage 201 of FIG. 2). It should be noted that like elements with the power converter of FIG. 3 will not be described again with respect to the power converter of FIG. 5. The first boost switching regulator is formed with a first boost inductor $L_{B1}$ and a first main power switch $S_{A1}$. The second boost switching regulator is formed with a second boost inductor $L_{B2}$ and a second main power switch $S_{A2}$. A common current-sense resistor RS senses a summed current of the first and second main power switches $S_{A1}$, $S_{A2}$. The power converter is formed with controller 510 to produce the duty cycles D1, D2 and, accordingly, the gate-drive signals GD1, GD2 for the first and second main power switches $S_{A1}$, $S_{A2}$ of the first and second interleaved boost switching regulators, respectively. An error amplifier 520 senses an output voltage Vout which is compared with a power system reference voltage $V_{system}$ to produce an error signal 560. The inverting input of the error amplifier 520 may be coupled to the output voltage Vout through a resistor-divider (not shown) to produce a scaled value of the output voltage Vout. The error signal 560 is coupled to an inverting input of a comparator 530 that compares the error signal 560 with a current-sense signal produced across the common current-sense resistor RS to produce an average current signal 570. The average current signal 570 is employed by a duty-cycle controller 540 to produce duty cycle signals D1, D2 to control the first and second main power switches $S_{A1}$, $S_{A2}$. In this manner, samples are obtained from a sum of the main power switch currents at the middle of their respective ON durations. Thus, the controller 510 uses the duty-cycle controller 540 to produce the duty cycles D1, D2 by sampling the currents of the first and second main power switches $S_{A1}$, $S_{A2}$ at their respective mid-points of their ON durations.

Current balancing is achieved by comparing the current samples from the two interleaved boost switching regulators and adjusting the respective duty cycle for each boost switching regulator. Current balancing between the two interleaved boost switching regulators is achieved with the comparator 530 and the common current-sense resistor RS. If duty cycles D1, D2 of the first and second main power switches $S_{A1}$, $S_{A2}$ are limited to be less than 50%, each respective current sample obtained at the mid-point of the respective duty cycle represents the current from the respective interleaved boost switching regulator. Odd-numbered current samples are compared to even-numbered samples, which reduces the number of analog-to-digital ("A/D") channels by one, produces improved current balancing, and provides a lower-cost solution.

In an embodiment, the common current-sense resistor can be formed with two current-sense resistors, one in series with a switched terminal of one main power switch, and the one in series with a switched terminal of the other main power switch. The two current-sense resistors are coupled together at source terminals of the main power switches. In an embodiment, a current-sense transformer or other current-sensing device such as a Hall effect device is used in place of a current-sense resistor. Thus, a current-sensing device can comprise a current-sensing resistor, a current-sensing transformer or other current-sensing mechanism.

Figure 6:
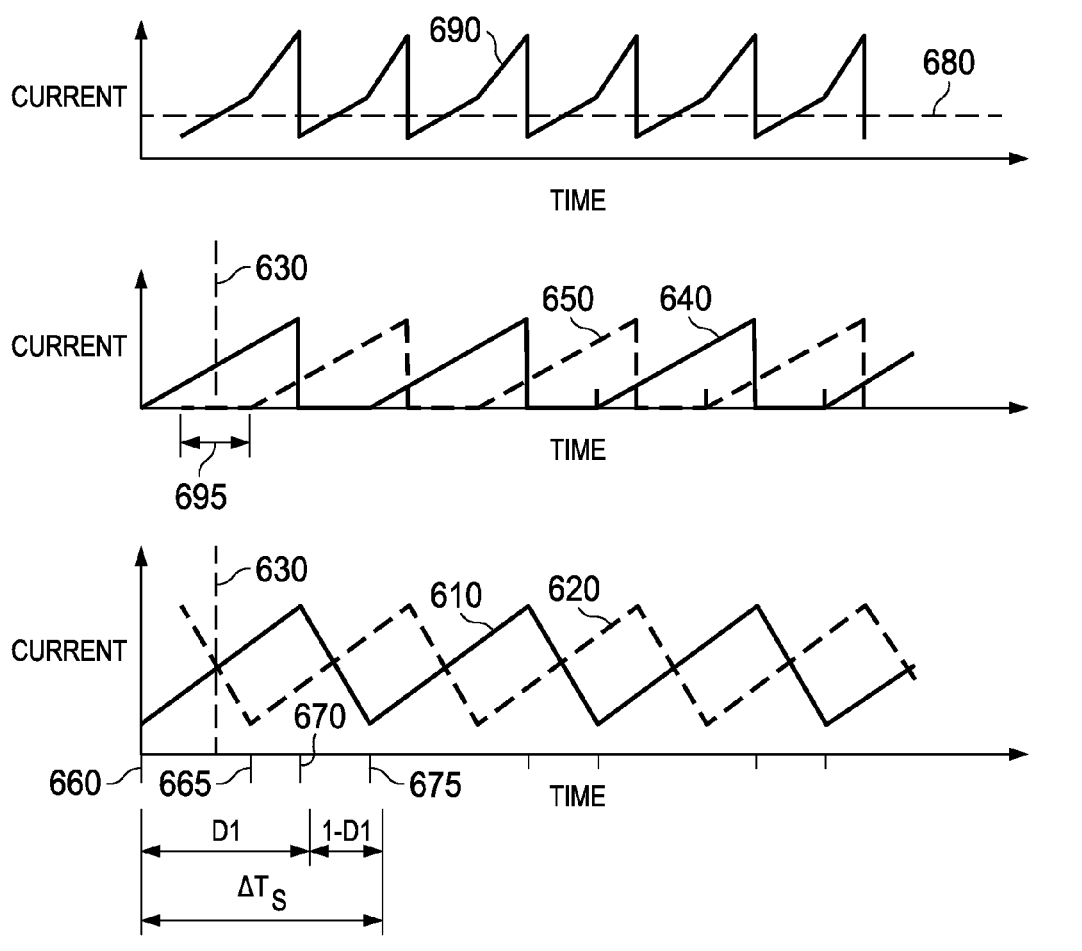
FIG. 6 illustrates graphical representations of exemplary operational parameters of the power converter of FIG. 5.

Turning now to FIG. 6, illustrated are graphical representations of exemplary operational parameters of the power converter of FIG. 5. A current waveform 610 represents current in the first boost inductor $L_{B1}$, and a current waveform 620 represents current in the second boost inductor $L_{B2}$. The duty cycle D1 for the first interleaved boost switching regulator is initiated by duty-cycle controller 540 at a beginning time 660 of a switching cycle of duration $\Delta T_s$, the switching cycle ending at an end time 675. The duty cycle D2 for the second interleaved boost switching regulator is initiated by the duty-cycle controller 540 at a mid-point 665 of the switching cycle. The duty cycle D1 for the first interleaved boost switching regulator is terminated at a time 670. The duty cycles D1, D2 are controlled such that the first and second interleaved boost switching regulators are 180 degrees out of phase. The current in the first main power switch $S_{A1}$ is sampled at a mid-point 630 of its duty cycle D1.

In the central portion of FIG. 6, a current waveform 640 of current in the first main power switch $S_{A1}$ and a current waveform 650 of current in the second main power switch $S_{A2}$ are illustrated. An effective threshold level 680 for the comparator 530 is produced by the error amplifier 520 (illustrated in FIG. 5), and is illustrated in the upper portion of FIG. 6. The effective threshold level 680 is produced with the comparator 530 and the common current-sense resistor RS. As a result, the current waveforms 640, 650 illustrated in the central portion of FIG. 6 are of substantially equal amplitude, as well as the current waveforms 610, 620 of currents in the first and second boost inductors $L_{B1}$, $L_{B2}$. This produces a lower level of electromagnetic interference and substantially equal heating of components in the two interleaved boost switching regulators.

A current waveform 690 of a current in the common current-sensing resistor RS is illustrated in the upper portion of FIG. 6. Since the duty cycle D1, D2 of each the first and second main power switch $S_{A1}$, $S_{A2}$ is limited to less than an upper duty-cycle limit (e.g., 95 percent), a time window 695 is produced during which no current flows through one main power switch (or a switched terminal thereof) when the main power switch current of the other main power switch (or a switched terminal thereof) is sampled during its ON time. Thus, a common current-sensing resistor RS and a single comparator 530 can be employed to independently sense a current in both the first and second main power switches $S_{A1}$, $S_{A2}$, thereby eliminating the effect of unequal current-sensing resistors and comparators with unequal offsets.

Thus, a controller for a power converter and method of operating the same has been introduced herein. In one embodiment, the controller includes a current-sense device (e.g., a common current-sense resistor) couplable in series with switched terminals of power switches (e.g., main power switches) of interleaved switching regulators (e.g., interleaved boost switching regulators) and configured to produce a current-sense signal. The controller also includes an error amplifier configured to produce an error signal as a function of a characteristic (e.g., an output voltage) of the power converter and a reference voltage (e.g., a power system reference voltage).

The controller also includes a duty-cycle controller configured to sample the current-sense signal at mid-points of duty cycles of the power switches and regulate the characteristic as a function of the error signal and the current-sense signal. The controller also includes a comparator configured to produce an average current signal as a function of the current-sense signal and the error signal. In accordance therewith, the duty-cycle controller is configured to produce drive signals for and to control the duty cycles of the power switches as a function of the average current signal. In an embodiment, a sampled current-sense signal represents a current through a switched terminal of one of the power switches when a current flowing through a switched terminal of another of the power switches is substantially zero. In another embodiment, one of the interleaved switching regulators is controlled with a duty cycle 180 degrees out of phase with respect another one of the interleaved switching regulators.

The controller or related method may be implemented as hardware (embodied in one or more chips including an integrated circuit such as an application specific integrated circuit), or may be implemented as software or firmware for execution by a processor (e.g., a digital signal processor) in accordance with memory. In particular, in the case of firmware or software, the exemplary embodiment can be provided as a computer program product including a computer readable medium embodying computer program code (i.e., software or firmware) thereon for execution by the processor.

Program or code segments making up the various embodiments may be stored in the computer readable medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, and the like.

Those skilled in the art should understand that the previously described embodiments of a power converter including a magnetics structure including U-shaped core pieces positioned on a rectilinear core piece and related methods of forming the same are submitted for illustrative purposes only. While a magnetics structure has been described in the environment of a power converter, the magnetics structure may also be applied to other systems such as, without limitation, a power amplifier and a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller for use with a power converter formed with interleaved switching regulators, comprising:
   a common current-sense device couplable in series with switched terminals of power switches of said interleaved switching regulators and configured to produce a current-sense signal representative of currents in said power switches;

an error amplifier configured to produce an error signal as a function of a characteristic of said power converter; and a duty-cycle controller configured to sample said current-sense signal at mid-points of duty cycles of said power switches and regulate said characteristic as a function of said error signal and said current-sense signal sampled at said mid-points.

2. The controller as recited in claim 1, wherein said current-sense device is a common current-sense resistor.

3. The controller as recited in claim 1, wherein said characteristic of said power converter is an output voltage.

4. The controller as recited in claim 1, wherein said error amplifier is configured to produce said error signal as a function of a reference voltage.

5. The controller as recited in claim 1, further comprising a comparator configured to produce an average current signal as a function of said current-sense signal sampled at said mid-points and said error signal.

6. The controller as recited in claim 5, wherein said duty-cycle controller is configured to produce drive signals for and to control said duty cycles of said power switches as a function of said average current signal.

7. The controller as recited in claim 1, wherein a sampled current-sense signal represents a current through a switched terminal of one of said power switches when a current flowing through a switched terminal of another of said power switches is substantially zero.

8. A method for use with a power converter formed with interleaved switching regulators, comprising:
    producing a current-sense signal with a common current-sense device in series with switched terminals of power switches of said interleaved switching regulators, said current-sense signal being representative of currents in said power switches;
    producing an error signal as a function of a characteristic of said power converter;
    sampling said current-sense signal at mid-points of duty cycles of said power switches; and
    regulating said characteristic as a function of said error signal and said current-sense signal sampled at said mid-points.

9. The method as recited in claim 8, wherein producing said error signal is a function of a reference voltage.

10. The method as recited in claim 8, further comprising producing an average current signal as a function of said current-sense signal sampled at said mid-points and said error signal.

11. The method as recited in claim 10, further comprising producing drive signals for and to control said duty cycles of said power switches as a function of said average current signal.

12. The method as recited in claim 8, wherein a sampled current-sense signal represents a current through a switched terminal of one of said power switches when a current flowing through a switched terminal of another of said power switches is substantially zero.

13. A power converter, comprising:
    a first interleaved switching regulator including a first power switch;
    a second interleaved switching regulator including a second power switch; and
    a controller, comprising:
        a common current-sense device couplable in series with switched terminals of said first and second power switches and configured to produce a current-sense signal representative of currents in said first and second power switches;
        an error amplifier configured to produce an error signal as a function of a characteristic of said power converter; and
        a duty-cycle controller configured to sample said current-sense signal at mid-points of duty cycles of said first and second power switches and regulate said characteristic as a function of said error signal and said current-sense signal sampled at said mid-points.

14. The power converter as recited in claim 13, wherein said current-sense device is a common current-sense resistor.

15. The power converter as recited in claim 13, wherein said characteristic of said power converter is an output voltage.

16. The power converter as recited in claim 13, wherein said error amplifier is configured to produce said error signal as a function of a reference voltage.

17. The power converter as recited in claim 13, wherein said controller further comprises a comparator configured to produce an average current signal as a function of said current-sense signal sampled at said mid-points and said error signal.

18. The power converter as recited in claim 17, wherein said duty-cycle controller is configured to produce drive signals for and to control said duty cycles of said first and second power switches as a function of said average current signal.

19. The power converter as recited in claim 13, wherein a sampled current-sense signal represents a current through a switched terminal of said first power switch when a current flowing through a switched terminal of said second power switch is substantially zero.

20. The power converter as recited in claim 13, wherein said first interleaved switching regulator is controlled with a duty cycle 180 degrees out of phase with respect to said second interleaved switching regulator.

* * * * *